US009942718B2

(12) United States Patent
Jayakumar et al.

(10) Patent No.: US 9,942,718 B2
(45) Date of Patent: Apr. 10, 2018

(54) METHODS AND APPARATUSES FOR USE IN PROVIDING LOCATION PARAMETERS TO MOBILE APPLICATIONS

(71) Applicant: QUALCOMM Incorporated, San Diego, CA (US)

(72) Inventors: Satheesh Jayakumar, Fremont, CA (US); Xintian Li, Cupertino, CA (US); Zhikai Tang, Santa Clara, CA (US); Wei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/135,061

(22) Filed: Dec. 19, 2013

(65) Prior Publication Data

US 2015/0011196 A1 Jan. 8, 2015

Related U.S. Application Data

(60) Provisional application No. 61/842,916, filed on Jul. 3, 2013.

(51) Int. Cl.
*H04W 4/02* (2018.01)
*H04W 52/28* (2009.01)
(Continued)

(52) U.S. Cl.
CPC .............. *H04W 4/028* (2013.01); *G01S 19/34* (2013.01); *G01S 19/48* (2013.01); *G06F 1/3228* (2013.01);
(Continued)

(58) Field of Classification Search
CPC .......... G01S 19/34; G01S 19/17; G01S 19/03; G01S 19/25; G01S 19/36; G01S 19/37;
(Continued)

(56) References Cited

U.S. PATENT DOCUMENTS 5,367,306 A 11/1994 Hollon et al.
6,141,570 A * 10/2000 O'Neill, Jr. ............. G01S 19/34
342/357.74
(Continued)

FOREIGN PATENT DOCUMENTS

| CN | 101210963 A | 7/2008 |
| CN | 102540226 A | 7/2012 |
| EP | 2180335 A1 | 4/2010 |

OTHER PUBLICATIONS

Goraczko M., et al., "Energy-Optimal Software Partitioning in Heterogeneous Multiprocessor Embedded Systems," In The 45th Design Automation Conference (DAC), 2008, pp. 1-6.
(Continued)

*Primary Examiner* — Christopher M Brandt
*Assistant Examiner* — Umair Ahsan
(74) *Attorney, Agent, or Firm* — Thien T. Nguyen

(57) ABSTRACT

Techniques are provided that may be implemented in a mobile device to provide one or more location parameters to one or more mobile processes (e.g., applications) provided and/or otherwise supported, at least in part, by the mobile device. For example, a mobile device may be configured to monitor one or more processes hosted on a first processor, and initiate a communication on a bus connecting the first processor to a positioning engine external to the first processor to obtain at least one updated location parameter in response to detection of activity of at least one of the one or more processes. In certain instances, the updated location parameter(s) may have been previously determined by the positioning engine.

26 Claims, 5 Drawing Sheets

(51) Int. Cl.
| | |
|---|---|
| *H04W 64/00* | (2009.01) |
| *G01S 19/34* | (2010.01) |
| *G06F 9/00* | (2006.01) |
| *H04W 4/04* | (2009.01) |
| *G06F 1/32* | (2006.01) |
| *H04L 29/08* | (2006.01) |
| *G01S 19/48* | (2010.01) |
| *G06F 11/00* | (2006.01) |

(52) U.S. Cl.
CPC .............. *G06F 1/3234* (2013.01); *G06F 9/00* (2013.01); *G06F 11/00* (2013.01); *H04W 4/04* (2013.01); *H04W 52/285* (2013.01); *H04W 64/00* (2013.01); *H04L 67/22* (2013.01)

(58) Field of Classification Search
CPC ........ G01S 19/421; G01S 19/45; G01S 19/48; G01S 2205/008; G01S 5/0009; G01S 5/0027; G01S 5/0252; H04W 24/02; H04W 24/04; H04W 24/10; H04W 4/02; H04W 4/028; H04W 52/0254; Y02B 60/50
USPC .... 342/357.31, 357.64, 357.74, 386, 357.28, 342/357.4, 357.77; 455/343.2, 404.2, 455/418, 456.1, 456.2, 456.6, 550.1, 574; 701/470
See application file for complete search history.

(56) References Cited

U.S. PATENT DOCUMENTS

| | | | |
|---|---|---|---|
| 6,222,484 B1 | 4/2001 | Seiple et al. | |
| 6,388,617 B1 | 5/2002 | Flood et al. | |
| 7,176,833 B2 | 2/2007 | Jendbro et al. | |
| 8,106,819 B1 | 1/2012 | Rahman et al. | |
| 2007/0126627 A1 | 6/2007 | Ueno et al. | |
| 2009/0192709 A1* | 7/2009 | Yonker et al. | 701/215 |
| 2010/0127919 A1* | 5/2010 | Curran | G01S 19/40 340/573.4 |
| 2010/0149030 A1 | 6/2010 | Verma et al. | |
| 2010/0240404 A1 | 9/2010 | McCrosky | |
| 2012/0122493 A1* | 5/2012 | Yato | 455/456.6 |
| 2012/0239950 A1* | 9/2012 | Davis | H04W 12/06 713/320 |
| 2014/0094198 A1* | 4/2014 | Heo et al. | 455/456.4 |
| 2015/0143151 A1* | 5/2015 | Yun | H04N 5/63 713/323 |

OTHER PUBLICATIONS

Ra M.R., et al., "Improving Energy Efficiency of Personal Sensing Applications with Heterogeneous Multi-Processors," In The 14th International Conference on Ubiquitous Computing (UBICOMP), 2012, 10 Pages.

International Search Report and Written Opinion—PCT/US2014/045320—ISA/EPO—dated Oct. 17, 2014.

International Preliminary Report on Patentability—PCT/US2014/045320 The International Bureau of WIPO—Geneva, Switzerland, dated Oct. 1, 2015.

* cited by examiner

ID
METHODS AND APPARATUSES FOR USE IN PROVIDING LOCATION PARAMETERS TO MOBILE APPLICATIONS

CLAIM OF PRIORITY UNDER 35 U.S.C. § 119

This patent application claims benefit of and priority to U.S. Provisional Patent Application 61/842,916, filed Jul. 3, 2013, entitled, "METHODS AND/OR SYSTEM FOR PROVIDING LOCATION PARAMETERS TO MOBILE APPLICATIONS", and which is assigned to the assignee hereof and incorporated herein by reference.

BACKGROUND

1. Field

The subject matter disclosed herein relates to mobile devices, and more particularly to methods, apparatuses and articles of manufacture for use by and/or in a mobile device to provide one or more location parameters to one or more mobile processes (e.g., applications) provided and/or otherwise supported, at least in part, by the mobile device.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or tracking device, etc.

A position and/or movements of a mobile device may be determined, at least in part, by a positioning and/or navigation capability (herein after simply referred to as a positioning capability) that may be implemented on board the mobile device, in one or more other electronic devices, and/or some combination thereof. Certain positioning capabilities may be based on one or more wireless signals transmitted by one or more transmitting devices and acquired by mobile device. By way of example, certain wireless signal-based positioning capabilities make use of wireless signals acquired from a satellite positioning system (SPS), such as, e.g., the global positioning system (GPS), etc.

In another example, certain wireless signal-based positioning capabilities make use of wireless signals acquired from terrestrial-based wireless transmitting devices, such as, e.g., a dedicated positioning Beacon transmitting device, an access point (AP) device which may be part of a wireless local area network, a base transceiver station which may be part of the cellular telephone system, and/or the like or some combination thereof. In certain implementations, a positioning capability may make use of one or more electronic files, such as, e.g., an electronic map, a routability graph, a radio heatmap, and/or the like or some combination thereof, to determine a position and/or other movements of the mobile device within a particular environment.

Since mobile devices tend to operate on battery power, there's often a desire to serve battery power while providing a reasonable user experience. Accordingly, there is an ongoing desire to provide high-quality yet efficient positioning capabilities/processes within a mobile device.

SUMMARY

In accordance with an aspect, a method may be provided which comprises, at a mobile device: monitoring one or more processes hosted on a first processor on the mobile device; and initiating a communication on a bus connecting the first processor to a positioning engine external to the first processor to obtain at least one updated location parameter in response to detection of activity of at least one of the one or more processes, the at least one updated location parameter having been previously determined by the positioning engine.

In accordance with an aspect, an apparatus may be provided for use in a mobile device, which comprises: means for monitoring one or more processes hosted on a first processor on the mobile device; and means for initiating a communication on a bus connecting the first processor to a positioning engine external to the first processor to obtain at least one updated location parameter in response to detection of activity of at least one of the one or more processes, the at least one updated location parameter having been previously determined by the positioning engine.

In accordance with an aspect, a mobile device may be provided which comprises: a bus; a second processor coupled to the bus and configured to obtain location parameters based, at least in part, on acquired signals; and a first processor coupled to the bus and configured to monitor one or more processes hosted on the first processor, and initiate a communication on the bus to the second processor to obtain at least one of the updated location parameters in response to detection of activity of at least one of the one or more processes, the at least one of the updated location parameters having been previously determined by the second processor.

In accordance with an aspect, an article of manufacture may be provided which comprises a non-transitory computer readable medium having stored therein computer implementable instructions executable by a first processor of a mobile device to: monitor one or more processes hosted on the first processor; and initiate a communication on a bus connecting the first processor to a positioning engine external to the first processor to obtain at least one updated location parameter in response to detection of activity of at least one of the one or more processes, the at least one updated location parameter having been previously determined by the positioning engine.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
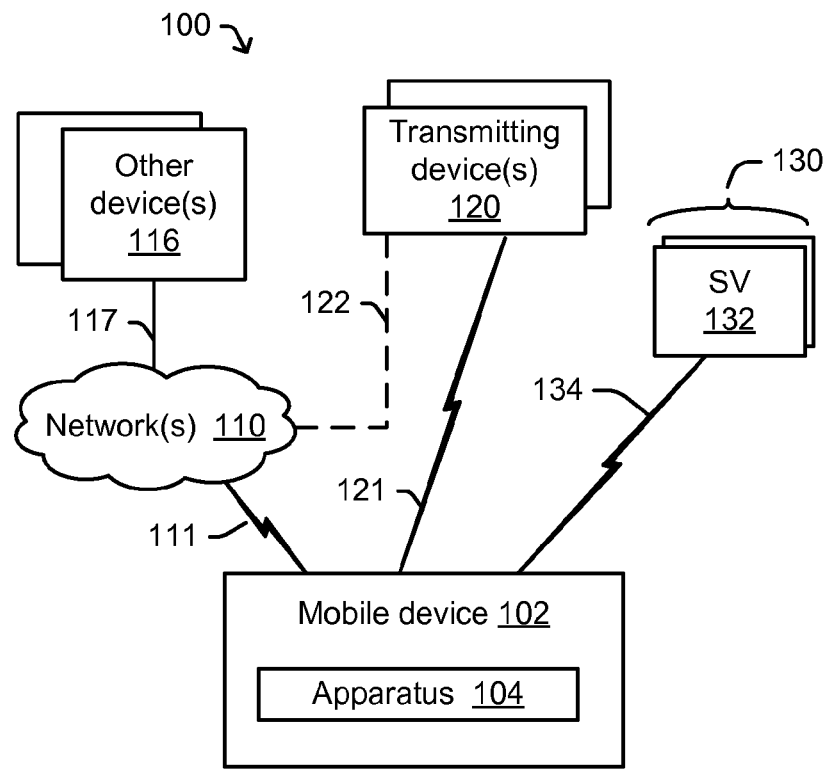
FIG. 1 is a schematic block diagram illustrating an example arrangement of representative electronic devices including an example mobile device configured to provide one or more location parameters to one or more mobile processes (e.g., applications) provided and/or otherwise supported, at least in part, by the mobile device, in accordance with an example implementation.

In particular implementations of a mobile device, a first processor (e.g., an application processor) may provide and/or otherwise support, at least in part, one or more processes (e.g., application programs and/or the like, hereinafter simply referred to as "processes," "applications," and/or "apps") that may employ, use or otherwise exploit position fixes or estimated locations of the mobile device. For example, such a mobile device may comprise a GNSS receiver and/or the like, which may be capable of computing estimated locations of the mobile device based, at least in part, on wireless signals acquired from transmitters in a satellite positioning system (SPS). In certain implementations, a mobile device may obtain an acceptable estimate of its location based, at least in part, on the acquisition of signals transmitted from terrestrial transmitting devices (e.g., cellular base stations, indoor wireless local area network (WLAN) access points, location Beacon transmitting devices, and/or the like or some combination thereof which may have known or determinable locations).

In certain example implementations, aspects of position determination or location estimation may be performed, at least in part, by a "location engine" or "positioning engine"; hereinafter simply referred to as a "position engine". In certain instances, such a position engine may be implemented in a mobile device in circuitry (e.g., a second processor) that may be separate and/or otherwise operatively independent in some manner from an application processor (e.g., a first processor) that hosts applications, some of which may use one or more location parameters, e.g., as determined by the positioning engine, and/or one or more positioning parameters which may comprise and/or be based, at least in part, on one or more of the location parameters as determined by the physician engine. For example, a positioning engine may be implemented in a modem processor and provide one or more determined location parameters to one or more applications hosted on an application processor. For example, one or more determined location parameters may be provided by a modem processor to an application processor via one or more connections, e.g., a bus. Here, for example, an apparatus and/or other like entity provided by an application processor may initiate a communication (e.g., a "call" message, and/or the like) to a positioning engine to obtain one or more location parameters, e.g., corresponding to a location estimate or position fix. In response to such a communication, a positioning engine and/or some supporting capability may initiate/execute a process (e.g., acquisition of signals transmitted by a GNSS transmitter, terrestrial-based transmitting device, and/or the like or some combination thereof) to obtain measurements for use in computing all or part of a location estimate or position fix for the mobile device. In particular implementations, a positioning engine may obtain all or part of a location estimate or position fix independently of any communication received from an application processor. One or more location parameters for a determined location estimate or position fix may be locally stored or cached (e.g., in a cache memory or registers of a modem processor and/or within one or more supporting certain/components coupled thereto), and subsequently provided to an application processor (and/or retrieved from the modem processor by an application processor) upon request. In certain instances, having been obtained from the physician engine, one or more location parameters may further be locally stored or cached for use by one or more applications hosted by the application processor.

As used herein, the term "hosted" with regard to a processor is intended to broadly represent that the processor may execute computer implementable instructions corresponding to all or part of one or more processes. It should be understood that a processor may, at times be actively executing such instructions while at other times the execution of such instructions may be paused or otherwise delayed, queued, scheduled, etc. In certain instances, an application and/or other like functions or capabilities may comprise all or part of one or more such processes.

In certain example implementations, an application processor may, from time to time and/or under particular conditions, transition to a reduced operational or reduced power state/mode, e.g. in which applications may be deactivated (e.g., partially or completely removed from application processor system memory) and/or otherwise affected in some manner while maintaining utilities or aspects of an operating system active to enable restoration of the application processor to a higher operational or power state. In a particular example implementation (e.g., in certain Android™ operating system based mobile device processing platforms), applications on an application processor in a reduced power state may not be capable of obtaining a most recently available location estimate or position fix while the applications are deactivated (e.g., the applications are halted as part of a reduced (lower) power state/mode to conserve battery resources). Activating one or more such deactivated applications on an application processor to obtain a most recently received location estimate or position fix, however, may unacceptably consume battery resources since the application processor may need to transition to a (higher) power state/mode.

As described in greater detail herein, in certain example implementations a mobile device may monitor one or more processes, which may be indicative of an operational or power state/mode of an application processor of the mobile device. If a particular predetermined activity or condition (e.g., an event) of the one or more processes is detected, the mobile device may initiate a communication and/or the like over one or more connections (e.g., a bus) operatively connecting the application processor to a positioning engine, all or part of which may be provided external to the application processor, to obtain one or more (updated) location parameters. In certain instances, a detected event may be indicative of an operational or power state of an application hosted on the application processor. In one aspect, accordingly, one or more location parameters may be obtained in response to a communication and made available (locally) to one or more of the applications hosted by the application processor, without unnecessarily consuming battery resources to restore a particular application to higher level power state/mode. Similarly, in certain instances, one or more location parameters may be provided in response to a communication from a position engine (e.g., within a modem processor), without unnecessarily consuming significant battery resources to transition the modem processor and/or other corresponding circuitry from a lower-power (consumption) state/mode to a relatively higher-power (consumption) state/mode.

As described in greater detail herein, in certain example implementations, a mobile device may monitor one or more processes hosted, at least in part, on a first processor of the mobile device, and in response to detection of activity of at least one of the one or more processes initiate a communication on a bus connecting the first processor to a positioning engine, which may be provided external to the first processor (e.g., on a second processor) to obtain at least one updated location parameter. Here, for example, at least one of the updated location parameters may have been previously determined by the positioning engine. Hence, in certain instances a position engine may not need to be activated, awoken, and/or otherwise affected in response to such a communication. Instead, in certain instances, one or more updated (e.g., most recent) location parameters may be obtained from a register or memory of a corresponding to the position engine. In certain example implementations, a first processor may comprise one or more processing units configured to act as an application processor and/or the like. In certain example implementations, a second processor may comprise one or more processing units configured to act as a positioning engine, a modem processor, and/or the like or some combination thereof.

In certain example implementations, a mobile device may be configured to post one or more events to an operating system of the first processor, and/or detect activity in response to a signal indicating occurrence of at least one event. In certain instances, a mobile device may be configured to detect activity based, at least in part, on a prediction that certain activity corresponding to one or more of the processes hosted, at least in part, by the first processor is expected to occur at a subsequent time. Here, for example, in certain instances a prediction may be based, at least in part, on a history of activity obtained from monitoring one or more of the processes. In certain instances, a prediction may be based, at least in part, on a time measurement.

As previously mentioned in described in greater detail herein, in certain implementations, activity of at least one of the processes may comprise and/or otherwise indicate restoration of an application to a particular power state/mode, e.g., as hosted by the first processor. In certain instances, in response to a communication, an operative state of a positioning engine (e.g., in a second processor), may remain unaffected. For example, as mentioned, in certain instances such an operative state may comprise a low power state (e.g., a lower power consumption state as opposed to a higher power consumption state).

In certain example implementations, a first processor and/or the like may receive at least one updated parameter in response to a communication, and the update one or more locally cached positioning parameters based, at least in part, on one or more updated location parameters.

Attention is drawn next to FIG. 1, which is a schematic block diagram illustrating an example arrangement 100 of representative electronic devices including an example mobile device 102 having an apparatus 104, and which may be configured to provide one or more location parameters to one or more applications provided and/or otherwise supported, at least in part, by the mobile device, in accordance with an example implementation.

Mobile device 102 may, for example, comprise a portable computing device, portable communication device, a portable tracking/location device, and/or the like or some combination thereof. Hence, in certain instances, mobile device 102 may comprise a cellular telephone, a smart phone, a laptop computer, a tablet computer, a navigation device, a wearable computer, a tracking mechanism, just to name a few examples.

As illustrated mobile device 102 may receive wireless signals over a communication link 111 from one or more networks 110, which may be further coupled to one or more other devices 116 via communication link 117. In certain implementations, network(s) 110 may be representative of one or more wireless communication systems, one or more cellular communication systems, one or more wired communication systems, one or more computer networks, all or part of the Internet, an intranet, a local area network, and/or various other computing and/or communication resources/devices/services.

Mobile device 102 may receive wireless signals over communication link 121 from one or more transmitting devices 120, one or more of which may be further coupled together and/or to network(s) 110, e.g., via communication link 122. Transmitting device(s) 120 may be representative of variety of different transmitting devices and/or transmitting/receiving devices that may transmit and/or receive wireless signals. In certain implementations, transmitting device(s) 120 may comprise one or more transmitting devices that may be part of or otherwise support network(s) 110 or some portion thereof. Hence, for example, transmitting device(s) 120 may represent a cellular base station, a femtocell device, a pico cell device, a WLAN access point device, a location Beacon device, and/or the like or some combination thereof, just to name a few examples. Indeed, in certain instances, transmitting device(s) 120 may represent one or more other mobile devices. In accordance with certain aspects, transmitting device(s) 120 may represent any electronic device that may transmit and/or receive wireless signals in support of various computing, communication, location, and/or other like services/capabilities provided or otherwise supported by mobile device 102.

In certain implementations, as shown in FIG. 1, a mobile device 102 may receive or acquire SPS signals 134 from one or more space vehicles (SVs) 132, which may be part of one or more SPS 130. In some embodiments, SPS 130 may be from one global navigation satellite system (GNSS), such as the GPS or Galileo satellite systems. In other embodiments, the SVs 132 may be from multiple GNSS such as, but not limited to, GPS, Galileo, Glonass, or Beidou (Compass) satellite systems. In other embodiments, the SVs 132 may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In particular implementations, and as discussed below, mobile device 102 may have circuitry and processing resources capable of computing a position fix or estimated location of mobile device 102. For example, mobile device 102 may compute a position fix based, at least in part, on pseudorange measurements to one or more the SVs 132. Here, mobile device 102 may compute such pseudorange measurements based, at least in part, on pseudonoise code phase detections in SPS signals 134 acquired from four or more SVs 132. In particular implementations, mobile device 102 may receive from positioning assistance data and/or the like from a server (e.g., represented by other device(s) 116) which may be used to aid in the acquisition of SPS signals 134 including, for example, almanac, ephemeris data, Doppler search windows, just to name a few examples. In certain implementations, similar other types of positioning assistance data may be obtained by mobile device 102 from one or more other devices with regard to one or more transmitting device(s) 120.

In certain example implementations, mobile device 102 may obtain a position fix by processing signals received from terrestrial transmitting device(s) 120 (one or more of which may have fixed and/or otherwise determinable locations) using any one of several techniques such as, for example, advanced forward trilateration (AFLT) and/or OTDOA. In these particular example techniques, a range from mobile device 102 may be measured to one or more or more of such terrestrial transmitters fixed at known locations based, at least in part, on pilot signals transmitted by the transmitting device(s) 120 from fixed otherwise determinable locations and received at mobile device 102. In certain example stations, as mentioned, one or more other device(s) 116 may be capable of providing certain types of positioning assistance data to mobile device 102. By way of example, certain types of positioning assistance data may be indicative of locations and identities of terrestrial transmitting devices, which may facilitate positioning techniques such as AFLT and OTDOA. For example, a server represented by other device(s) 116 may provide all or part of a base station almanac (BSA) and/or the like, which may be indicative of locations and identities of cellular base stations, etc., in a particular region or regions.

In particular environments such as indoor environments or urban canyons, mobile device 102 may not be capable of adequately acquiring SPS signals 134 from a sufficient number of SVs 132 and/or two perform AFLT or OTDOA to compute a position fix from acquisition of signals from applicable outdoor terrestrial transmitting devices. Hence, in certain instances, mobile device 102 may be capable of computing a position fix based, at least in part, on wireless signals acquired from other transmitting devices, e.g., local/indoor transmitting devices (e.g., WLAN access points, femto cell transceivers, Bluetooth devices, etc., which may be positioned at known or otherwise determinable locations). Accordingly, in certain implementations, mobile device 102 may obtain all or part of a position fix by measuring ranges to one or more indoor terrestrial wireless access point devices and/like. Such ranges may be measured, for example, by obtaining a MAC ID address from wireless signals received from such a transmitting device and obtaining range measurements to the transmitting device (e.g., at least in part, by measuring one or more characteristics of the received signals). By way of example, in certain implementations a received signal strength (RSSI), a round trip time (RTT), an angle of arrival (AOA), and/or the like or some combination thereof may be determined/considered. In certain implementations, mobile device 102 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address and/or some other distinctly unique identifier which may be discernible from a signal acquired from a local transmitter), expected RSSI from signals transmitted by the identified local transmitting devices, an expected RTT from the identified transmitting devices, and possibly standard deviations from these expected RSSI or RTT. It should be understood, however, that these are merely examples of values that may be stored in, modeled, and/or otherwise functionally/mathematically represented by a radio heatmap and/or the like, and that claimed subject matter is not limited in this respect.

In addition to measurements obtained from the acquisition of wireless signals from local transmitting devices, according to a particular embodiment, mobile device 102 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating all or part of a location or motion state of mobile device 102.

Figure 2:
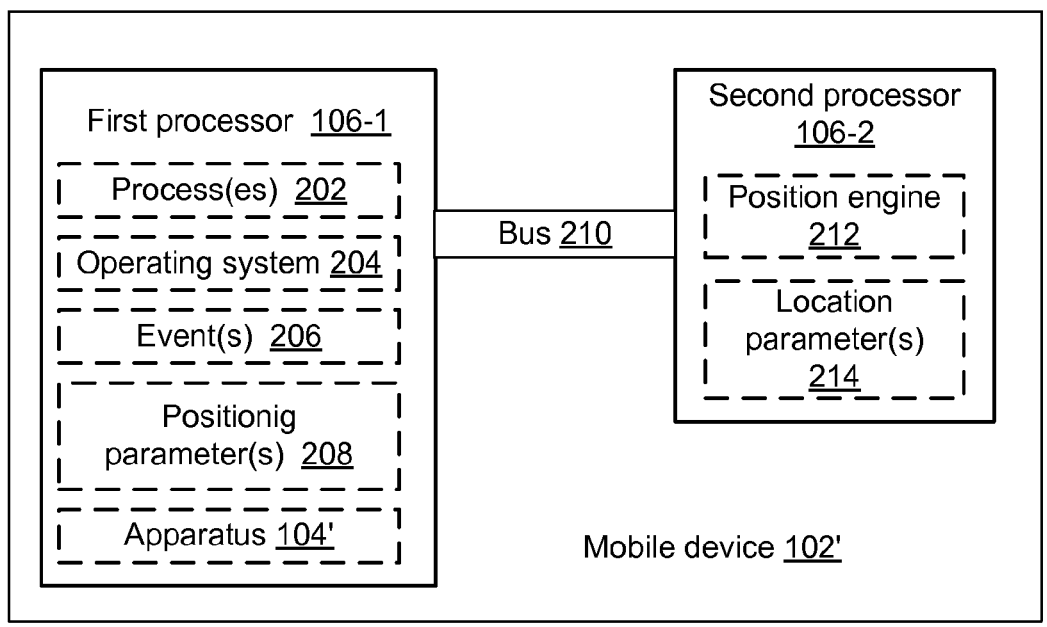
FIG. 2 is a schematic block diagram illustrating an example mobile device, e.g., as in FIG. 1, configured to provide one or more location parameters to one or more processes provided and/or otherwise supported, at least in part by a first processor within the mobile device, in accordance with an example implementation.

Attention is drawn next to FIG. 2, which is a schematic block diagram illustrating an example mobile device 102' configured to provide one or more location parameters 214 determined, at least in part, by a positioning engine 212 (and/or one or more corresponding positioning parameters 208) to one or more processes 202 provided and/or otherwise supported, at least in part, by a first processor 106-1 within mobile device 102', in accordance with an example implementation. As illustrated in this example, positioning engine 212 may be provided, at least in part, by second processor 102-2. As shown first processor 106-1 and second processor 106-2 may be operatively connected via one or more connections represented in FIG. 2 by bus 210.

In accordance with certain implementations, an apparatus 104' may be provided, at least in part, by first processor 106-1 to monitor activity corresponding to one or more of processes 202. By way of example, in certain implementations one or more events 206 may be posted to an operating system 204, such that certain activity may be detected, e.g., in response to one or more corresponding signals indicating an occurrence of one or more events. By way of some non-limiting examples, certain operating system and/or other like processing related events 206 may be indicative of or otherwise correspond to a wake-up or some operational state/mode transformation, e.g., corresponding to one or more processes 202. In certain instances, an event 206 may be indicative of and/or correspond to a display on/off event, a time zone event, a locale event, a phone context event, and/or the like or some combination, again just to name a few examples. Accordingly, an event 206 may be indicative of a likelihood that one or more processes 202 have been or may become activated/deactivated, etc. By monitoring such events, apparatus 104' may selectively determine whether to initiate a communication on bus 210, e.g. to obtain at least one updated location parameter 214. For example, it may be beneficial to initiate a communication in response to determining that a process 202 has been activated or may be predicted to become activated at some point in time, and which may make use of one or more updated location parameters 214, and/or one or more corresponding positioning parameters 208. In response to receiving a communication, one or more location parameters 214 may be provided over bus 210 from second processor 106-2 and stored directly as one or more positioning parameters 208 and/or otherwise processed in some manner to obtain one or more positioning parameters 208. Positioning parameters 208 may be stored in one or more local caches available to and/or within first processor 106-1. In certain implementations, one or more positioning parameters 208 may be provided in a particular form as may be useful to one or more particular processes 202. In certain other implementations, one or more processing parameters 208 may be provided in a common form which may be useful to a plurality of processes 202. In certain implementations, in addition to determining whether activity has occurred or may occur (e.g., based on history instances based on one or more events 206, apparatus 104' may initiate a communication based, at least in part, on a measure of time passage (e.g., a periodic time, a timer, a random time, etc.). Hence, for example, in certain implementations a communication may be initiated based, at least in part, on one or more actual events 206, one or more predicted events, a measure of time passage, and/or the like or some combination thereof just to name a few examples. As previously mentioned, in certain instances it may be desirable to initiate a communication to obtain updated location parameters 214 at certain opportunistic moments, e.g., particularly if corresponding power consumption is particularly low/irrelevant. One benefit being that a process 202 may experience quick and efficient access to a most recent positioning parameter 208, which may improve a user experience, and/or possibly reduce power consumption.

Figure 3A:
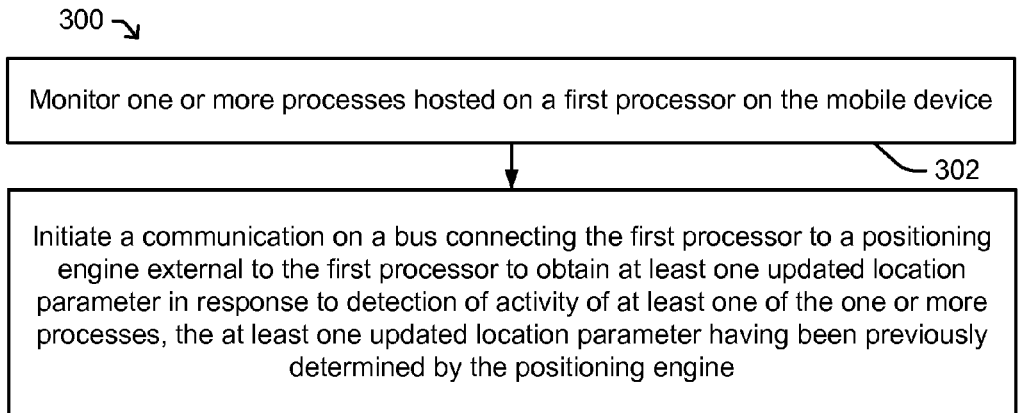
FIG. 3A and FIG. 3B are flow diagrams illustrating some example processes that may be implemented in a mobile device to provide one or more location parameters to one or more processes provided and/or otherwise supported, at least in part, by a mobile device, e.g., as in FIG. 1, in accordance with certain example implementations.

Attention is drawn next to FIG. 3A, which is a flow diagram illustrating an example process 300 that may be implemented in a mobile device to provide one or more location parameters to one or more processes provided and/or otherwise supported, at least in part, by a mobile device, in accordance with certain example implementations. At example block 302, one or more processes posted on a first processor (e.g., an application processor) may be monitored, e.g., for certain actual and/or predicted activity. At example block 304, a communication to obtain at least one updated location parameter may be initiated on a bus connecting the first processor to a positioning engine external to the first processor. The communication may, for example, be initiated in response to detection of activity of at least one of the monitored processes. The updated location parameter may, for example, have been previously determined by the positioning engine.

Figure 3B:
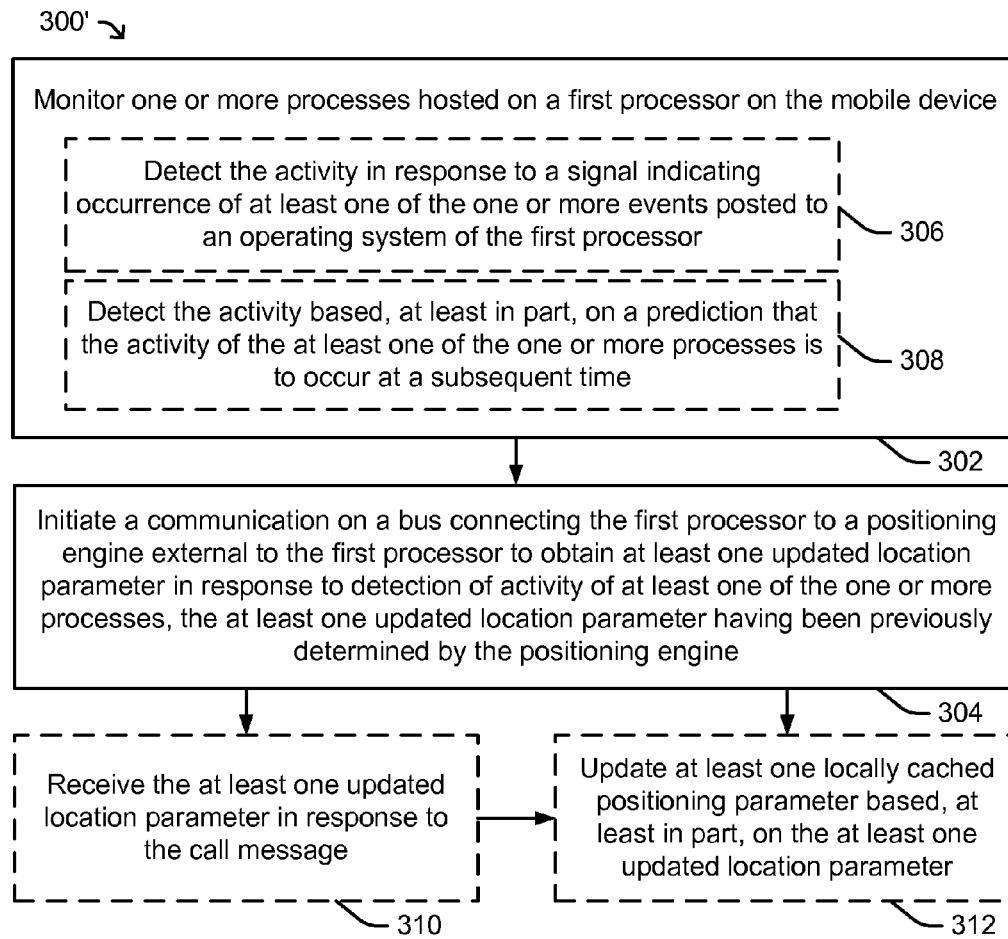

Attention is drawn next to FIG. 3B, which is a flow diagram illustrating an example process 300' that may be implemented in a mobile device to provide one or more location parameters to one or more processes provided and/or otherwise supported, at least in part, by a mobile device, in accordance with certain example implementations. At example block 302, one or more processes posted on a first processor (e.g., an application processor) may be monitored, e.g., for certain actual and/or predicted activity. In certain implementations, at block 306, the activity may be detected in response to a signal indicating occurrence of at least one event, e.g., as posted to an operating system of the first processor. By way of a non-limiting example, in certain implementations a first processor may be configured, at least in part, to host a version of Android™ operating system available from Google Inc., of Mountain View, Calif. In certain instances, at example block 308, activity may be detected based, at least in part, on a prediction that certain activity of at least one of the processes is expected or likely to occur at a subsequent time.

At example block 304, a communication to obtain at least one updated location parameter may be initiated on a bus connecting the first processor to a positioning engine external to the first processor. The communication may, for example, be initiated in response to detection of activity of at least one of the monitored processes. The updated location parameter may, for example, have been previously determined by the positioning engine.

At example block 310, at least one updated location parameter may be received in response to a communication. By way of example, in certain implementations, a second processor and/or other corresponding circuitry may respond to a communication by providing one or more location parameters to a first processor via a bus. By way of example, in certain implementations, in response to a communication, a second processor may provide access to one or more location parameters which may be retrieved over a bus by a first processor and/or other corresponding circuitry. In certain example implementations, a communication may be indicative of one or more particular location parameters. In certain implementations, as described in certain passages herein, one or more location parameters may be referred to as "zero power position(s)", or simply "ZPPs" to indicate that the location parameters may be obtained without having to expend significant electrical power resources, e.g., as previously described as one potential benefit.

At example block 312, at least one locally cached positioning parameter may be updated based, at least in part, on at least one updated location parameter, e.g., as received at example block 310. As mentioned, in certain instances a received location parameter may be stored in a local cache directly as a positioning parameter, while in other instances a received location parameter may be processed in some manner to obtain a position parameter which may be stored in a local cache.

Figure 4:
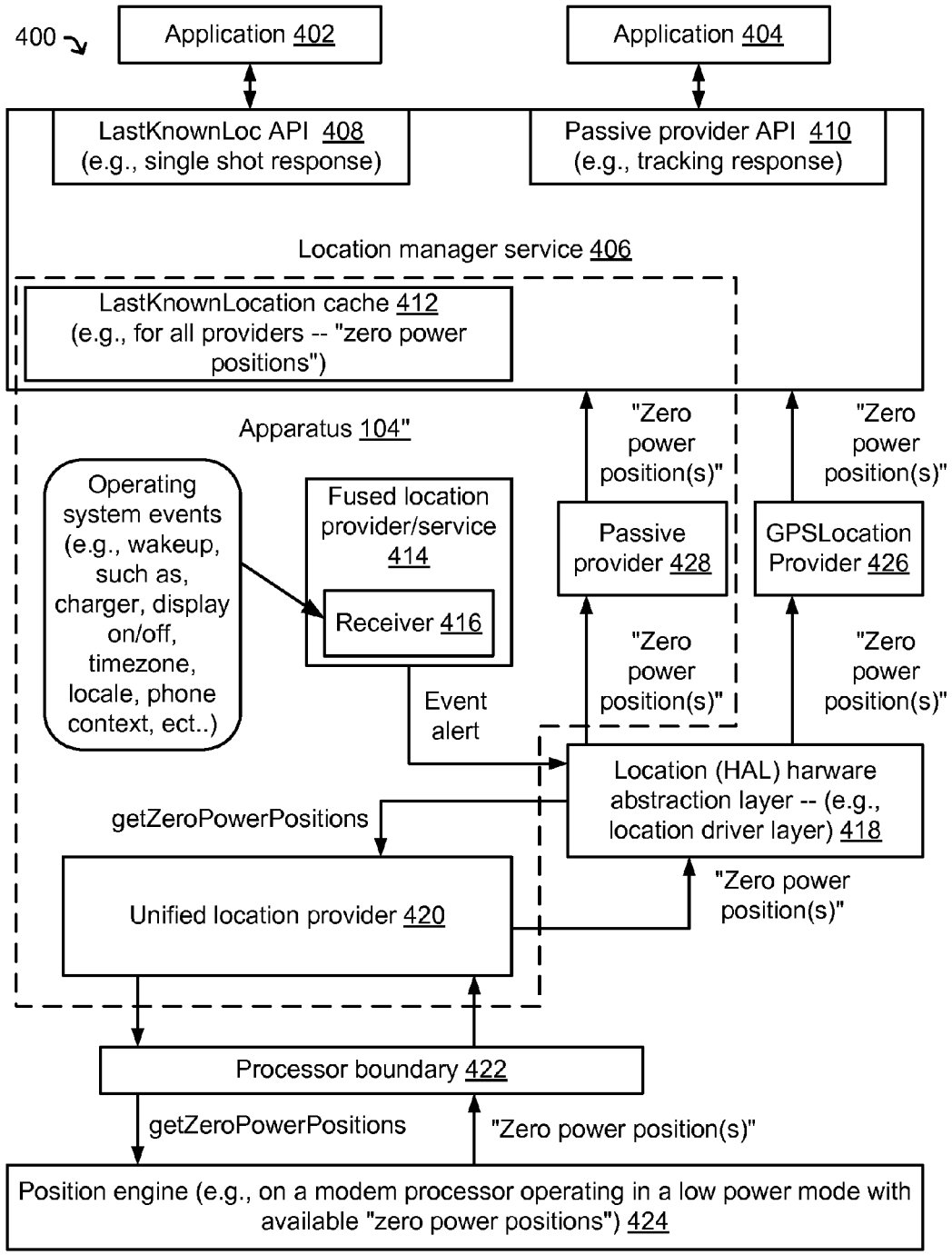
FIG. 4 is a schematic diagram illustrating certain features of an example mobile device, e.g., as in FIG. 1, configured to provide one or more location parameters to one or more processes provided and/or otherwise supported, at least in part, by the mobile device, in accordance with certain example implementations.

Attention is drawn next to FIG. 4, which is a schematic diagram illustrating certain features of an example system 400 that may be implemented in mobile device to provide one or more location parameters and/or corresponding position parameters (e.g., "zero power position(s)") to one or more applications 402 and 404 provided and/or otherwise supported, at least in part, by the mobile device, in accordance with certain example implementations.

Example system 400 comprises a location manager service 406 comprising to example application programming interfaces, namely a last known location API ("LastKnownLoc API") 408 which may be used to provide for a single shot response, and a Passive Provider API 410 which may be used to provide for a tracking response. Additionally, in this example location manager service 406 may comprise one or more caches and/or the like, represented here by last known location cache ("LastKnownLocation cache") 412, which may serve applicable "zero power positions" for one or more providers, e.g. to applications 402 and 404, for example.

Certain example features that may be implemented, at least in part, in an apparatus 104'' or illustrated by the dashed box line as comprising LastKnownLocation cache 412, a fused location provider/service 414 comprising a receiver 416, a passive location provider ("PassiveLocProv") 428, and a unified location provider 420. Additional system features not included in this example apparatus 104'', include a GPS location provider ("GPSLocationProvider") 426, and a location hardware abstraction layer (HAL) 418, which may comprise a location driver and/or the like.

A processor boundary 422 is also illustrated as separate a position engine 424 which may be provided using a second processor (e.g., a modem processor) from the other system features in example system 400 which may be implemented on a first processor (e.g., an application processor). Processor boundary 422 may, for example, comprise one or more connections, all or part of one or more buses, and/or various other circuitries to operatively coupled the first and second processors to accommodate otherwise support the techniques provided herein.

Hence, in certain example implementations processor boundary 422 may comprise a bus connecting different devices on a mobile device such as an application processor and a modem processor. For example, application 402 and application 404, which may be hosted on an application processor, may obtain location parameters stored or maintained by location manager service 406, which may also be hosted on the application processor. Fused location provider/ service 414, location HAL 418, and unified location provider 420 may also be hosted on the application processor. Processes on the application processor may communicate with location engine 424 (e.g., hosted on a modem processor) through processor boundary 422.

In certain instances, location manager service 406 may locally cache or store last known location parameters (e.g., one or more positioning parameters 208, one or more location parameters 214, one or more "zero power positions"). In certain example implementations, such last known location parameters may be indicative of all or part of a last known estimated location of the mobile device, and possibly corresponding measure(s) of uncertainty of the estimated location. One or more stored last known location parameters may comprise location parameters previously obtained from positioning engine 424. In a particular implementation, applications 402 and 404, and possibly other processes hosted on the application processor, may be transitioned to an inactive and/or some other low-power state/mode (e.g., to possibly conserve battery resources powering the application processor). While in such a state/mode, in some scenarios, entities on the application processor may not be enabled to update a local storage or cache of last known location parameters based on a most recently obtained position fix from an external positioning engine. Other processes hosted on the application processor (e.g., fused location provider/service 414, location HAL 418 and unified location provider 420) may remain active.

In certain example implementations, fused location provider/service 414 may detect one or more (actual or predicted) events or conditions indicative of an operational state of the application processor and, in response to such a detection, provide an event alert signal and/or the like to unified location provider 420. In response to the event alert signal, unified location provider 420 may initiate a communication, e.g., a "getZeroPowerPositions" call message, over processor boundary 422 to positioning engine 424 to obtain positioning parameters that may be more recent than positioning parameters maintained by location manager service 406 in a cache 412. In response to the communication from unified location provider 420, positioning engine 424 may provide updated location parameters, e.g., one or more "Zero Power Positions." Zero Power Position(s) may, for example, comprise and/or otherwise be indicative of all or part of an estimated location of the mobile device and measures of uncertainty of the estimated location, a time when the estimated location was determined/computed, one or more sources for the location estimate, etc., and/or the like or some combination thereof just to name a few examples. As previously mentioned, an estimated location may be determined by positioning engine 424 based, at least in part, on acquisition of SPS signals or signals transmitted from terrestrial transmitters, e.g., using one or more techniques discussed above and/or the like.

Unified location provider 420 may, for example, forward values for Zero Power Positions through location HAL 418 to location manager service 406, which may then be used to update, refresh, drive, etc., one or more of the positioning parameters cached or stored to indicate a last known location of the mobile device. Applications 402 and 404 may subsequently access/obtain and use all or part of the positioning parameters available with regard to the last known location (updated with the received Zero Power Positions) without necessarily having to reactivate and/or otherwise affect a state/mode of the application processor, and/or a state/mode of the position engine 424.

In certain example implementations, events or conditions detected at fused location provider/service 414 (e.g., and receiver 416) may indicate that the application processor is currently in or expected to be within an operational state/mode, which may enable receipt of location parameters and/or storage of responding positioning parameters in Zero Power Positions in a manner to update or refresh a Last Known Location without significantly consuming battery resources, e.g., to launch or otherwise reactivate an application processor to a higher operational state (e.g., to reactivate application 402 and/or 404).

In a particular implementation, as previously mentioned an application processor may host an Android™ operating system, portions of which may be maintained in an operational state while the application processor is in a reduced operational state (e.g., applications 402 and 404 being inactive in a reduced power state). According to an embodiment, fused location provider/service 414 may also be in an operational state/mode while the application processor is in a reduced operational state/mode. Here, for example, fused location provider/service 414 may register with the operating system to receive signals alerting as to an occurrence of particular conditions or events. Such conditions or events may comprise, for example, Android "wake up" events including battery charger plugged in (e.g., battery charging), display on, time zone, locale, operational phone context, just to provide a few examples.

Figure 5:
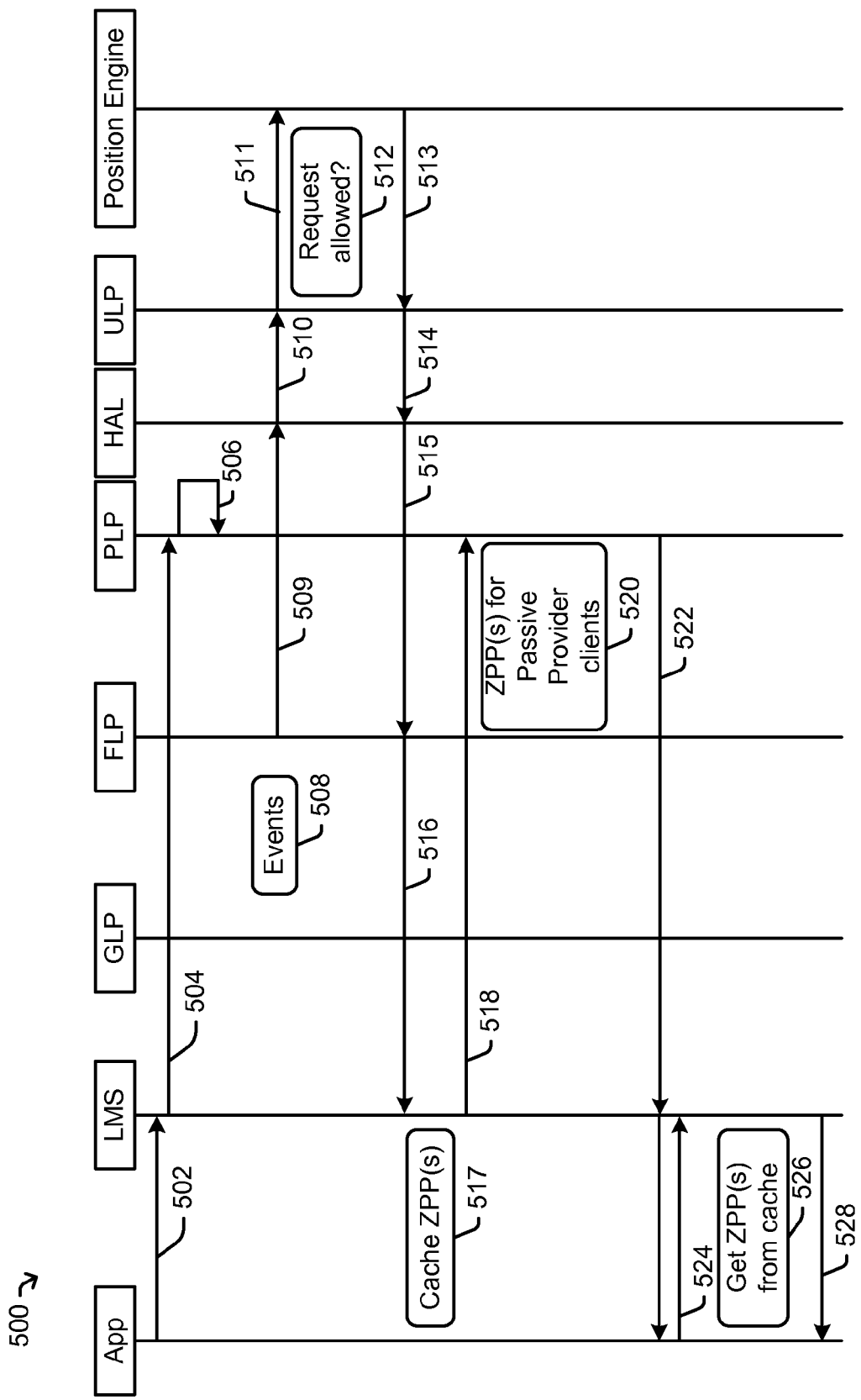
FIG. 5 is an information flow diagram illustrating certain example communication and/or processing aspects of a mobile device, e.g., as FIG. 4, configured to provide one or more location parameters to one or more processes provided and/or otherwise supported, at least in part, by the mobile device, in accordance with certain example implementation.

Attention is drawn next to FIG. 5, which is an information flow diagram 500 illustrating certain example communication and/or processing aspects of a mobile device, e.g., as FIG. 4, configured to provide one or more location parameters and/or corresponding physician parameters to one or more processes provided and/or otherwise supported, at least in part, by the mobile device, in accordance with certain example implementation.

System features corresponding to example system 400 (FIG. 4) are illustrated along the top of diagram 500 using abbreviations. Thus for example, reading from left to right, the first feature "App" is representative of an application (e.g., application 402, application 404), the second feature "LMS" is representative of location manager service 406, the third feature "GLP" is representative of GPSLocationProvider 426, the fourth feature "FLP" is representative of fused location provider/service 414, the fifth feature "PLP" is representative of PassiveLocProv 428, the sixth feature "HAL" is representative of Location HAL 418, the seventh feature "ULP" is representative of unified location provider 420, and the eighth and final feature is representative of position engine 424.

Further, in FIG. 5, certain example message flows are illustrated and identified by reference numbers, as are certain process highlights. Thus, for example, a location request for a tracking response corresponding to passive provider API 410 may comprise message 502 ("requestLocationUpdates") from the App to the LMS, which may be passed from the LMS as message 504 through the GLP and FLP to the PLP. As indicated by message flow 506, the PLP may listen for location updates from all providers, e.g., in support of a tracking response. Is between LMS and PLP, message flow 506 corresponds to processing at PLP.

In a second example message flow, at process highlight 508, labeled as "Events", the FLP may detect/determine that certain activities have occurred or may predict that certain activities may be likely to occur at the subsequent time, and forward message 509 (e.g., "ApplicationProcWakeUpEvents") to the HAL, which may forward a corresponding message 510 (e.g., "WakeUpEvents") to the ULP, which may forward a corresponding message 511 to the position engine, e.g., across processor boundary 422 (FIG. 4). At process highlight 512, a determination may be made as to whether a session request may be allowed. If a session request determined to be allowed, the position engine may forward the message 513 (e.g., "returned zero power position") to the ULP, which may forward a corresponding message 514 (e.g., "return ZPP") to the HAL, which may forward message 515 (e.g., "return ZPP") to the FLP, which may forward message 516 (e.g., "report zero power position") through the GLP to the LMS. The LMS may subsequently cache one or more location parameters and/or corresponding physician parameters as represented by process highlight 517. In certain instances, the LMS may forward message 518 (e.g., "inject zero power position") to the PLP, which may indicate or otherwise determine ZPP positions as updated in reportable to one or more passive provider clients (e.g., as represented by process highlights 520) and forward message 522 (e.g., "report zero power position") to the LMS, which may pass message 522 to the App.

A third example message flow, which begins at message 524 (e.g., "getLastKnownLocation(provider)") from the App to the LMS, includes process highlight 526 at the LMS wherein ZPP(s) may be obtained/retrieved from a cache, and ends with message 528 (e.g., "returned zero power position") from the LMS to the App. Hence, for example, this third example message flow may be used get the last known location, e.g., as part of a single shot response via LastKnownLoc API 408.

Figure 6:
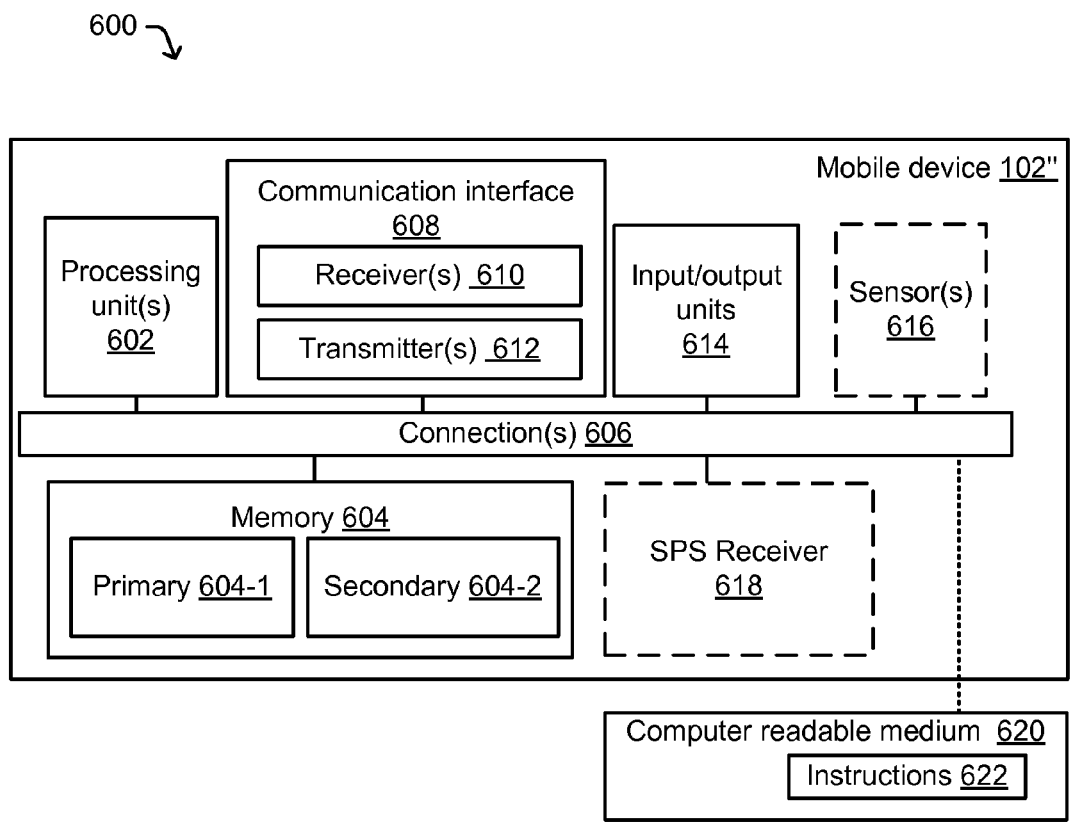
FIG. 6 is a schematic diagram illustrating certain features of an example computing platform that may be provisioned within a mobile device, e.g., as in FIG. 1, in accordance with certain example implementations.

Attention is drawn next to FIG. 6, which is a schematic diagram illustrating certain features of an example computing platform 600 that may be provisioned within a mobile device 102, e.g., as in FIG. 1, in accordance with certain example implementations.

As illustrated special computing platform 600 may comprise one or more processing units 602 (e.g., which may be configured to provide a first processor, and a second process in accordance with certain techniques provided herein) coupled to memory 604 via one or more buses/connections 606 (e.g., one or more electrical conductors, one or more electrically conductive paths, one or more buses, one or more fiber-optic paths, one or more circuits, one or more buffers, one or more transmitters, one or more receivers, etc.). Processing unit(s) 602 may, for example, be implemented in hardware or a combination of hardware and software. Processing unit(s) 602 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof. As mentioned in certain examples, all or part of one or more processing units may be configured to serve as application processor, and all or part of one or more other processing units may be configured to serve as a modem processor, and/or the like.

Memory 604 may be representative of any data storage mechanism. Memory 604 may include, for example, a primary memory 604-1 and/or a secondary memory 604-2. Primary memory 604-1 may comprise, for example, a random access memory, read only memory, etc. While illustrated in this example as being separate from the processing units, it should be understood that all or part of a primary memory may be provided within or otherwise co-located and coupled with processing unit 602 or other like circuitry within mobile device 102. Secondary memory 604-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 620. Memory 604 and/or non-transitory computer readable medium 620 may comprise instructions 622 for use in performing data processing, e.g., in accordance with the applicable techniques as provided herein.

Special purpose computing platform 600 may, for example, further comprise one or more communication interface 608. Communication interface 608 may, for example, comprise one or more wired and/or wireless network interface units, radios, modems, etc., represented here by one or more receivers 610 and one or more transmitters 612. It should be understood that in certain implementations, communication interface 608 may comprise one or more transceivers, and/or the like. Further, it should be understood that although not shown, communication interface 608 may comprise one or more antennas and/or other circuitry as may be applicable given the communication interface capability.

In accordance with certain example implementations, communication interface 608 may, for example, be enabled for use with various wired communication networks, e.g., such as telephone system, a local area network, a wide area network, a personal area network, an intranet, the Internet, etc.

Mobile device 102 may, for example, further comprise one or more input and/or output units 614. Input and/or output units 614 may represent one or more devices or other like mechanisms that may be used to obtain inputs from and/or provide outputs to one or more other devices and/or a user. Thus, for example, input and/or output units 614 may comprise various buttons, switches, a touch pad, a trackball, a joystick, a touch screen, a keyboard, a microphone, a camera, and/or the like, which may be used to receive one or more user inputs. In certain instances, input and/or output units 614 may comprise various devices that may be used in producing a visual output, an audible output, and/or a tactile output for a user. For example, input and/or output units 614 may be used to present a video display, graphical user interface, positioning and/or navigation related information, visual representations of electronic map, routing directions, etc., via a display mechanism and/or audio mechanism.

Mobile device 102 may, for example, comprise one or more sensors 616. For example, sensor(s) 616 may represent one or more environmental sensors, such as, e.g., a magnetometer or compass, a barometer or altimeter, etc., and which may be useful for positioning. For example, sensor(s) 616 may represent one or more inertial sensors, which may be useful in detecting certain movements of mobile device 102. Thus for example, sensor(s) 616 may comprise one or more accelerometers, one or one or more gyroscopes. Further, in certain instances sensor(s) 616 may comprise and/or take the form of one or more input devices such as a microphone, a camera, a light sensor, etc.

SPS receiver 618 may be capable of acquiring and acquiring wireless signals 134 via one or more antennas (not shown). SPS receiver 618 may also process, in whole or in part, acquired wireless signals 134 for estimating a position and/or a motion of mobile device 102. In certain instances, SPS receiver 618 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 602, memory 604, etc., in conjunction with SPS receiver 618. Storage of SPS or other signals for use in performing positioning operations may be performed in memory 604 or registers (not shown).

In certain instances, sensor(s) 616 may generate analog or digital signals that may be stored in memory 604 and processed by DPS(s) (not shown) or processing unit(s) 602 in support of one or more applications such as, for example, applications directed to positioning or navigation operations based, at least in part, on one or more positioning functions.

Processing unit(s) 602 may comprise a dedicated modem processor or the like that may be capable of performing baseband processing of signals acquired and down converted at receiver(s) 610 of communication interface 608 or SPS receiver 609. Similarly, a modem processor or the like may perform baseband processing of signals to be up converted for transmission by (wireless) transmitter(s) 612. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

In accordance with certain example implementations, communication interface 608 may, for example, be enabled for use with various wired communication networks, e.g., such as telephone system, a local area network, a wide area network, a personal area network, an intranet, the Internet, etc. In accordance with certain example implementations communication interface 608 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

In accordance with certain further aspects, the techniques is described above may be adapted/applied to analyze operating system events to predict with a high level of accuracy if an application processor may remain awake for a time interval significantly larger than the time required to carry out the retrieval of the aged position, e.g., from an external position engine within a modem processor. As such, in certain instances, an algorithm may be implemented to determine when a Wifi scan and/or the like begins, which additional knowledge may be available from system properties is to how long such a scan may last. Hence, for example, one may determine that such a WiFi scan and/or the like may cause the application processor to remain awake and/or a particular state/mode for a particular period of time e.g., perhaps five seconds. Accordingly, it may be possible to retrieve certain updated location parameters for an aged position from the position engine/modem processor without significant incremental power usage, which may improve performance and/or the user experience of many location applications. It should be recognized that the example above is not intended to limit claimed subject matter, and that different event/activity decisions and/or predictions may be considered, including, for example certain Bluetooth scans, certain audio player activity, etc.

In accordance with certain example implementations, a HAL API and/or the like may be provided/implemented to inform a native unified location provider that a system event of interest may have occurred and/or is predicted to occur with regard to the operating system. Such an API may, for example, take the form an API at the JNI (Java Native Interface) layer that allows communication between an intelligent agent and/or the like which may be implemented in a Java layer and a native layer. For example, static jboolean system_update (JNI Env* env, jobject obj, SysEvent systemEvent) and/or the like may be implemented wherein SysEvent may be a data structure that may provide information on certain useful events from the (e.g., Android, and/or other like) operating system layer. In certain instances, techniques and/or the like may be particularly useful to assist a native engine to determine if an application processor is out of a particular state/mode (e.g., a sleep state), & or two make meaningful predictions of when application processor a transition out of such a (sleep) state/mode at a subsequent time.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
    monitoring one or more first processes hosted on a first processor on said mobile device;
    transitioning one or more second processes hosted on said first processor to an inactive state, said one or more second processes utilizing location parameters;
    initiating a communication on a bus connecting said first processor to a positioning engine external to said first processor to obtain at least one updated location parameter, without activating said positioning engine, in response to detection of an operational mode transformation of at least one of said one or more first processes, said at least one updated location parameter having been previously determined by said positioning engine;
    updating a locally stored positioning parameter based, at least in part, on said at least one updated location parameter while maintaining said one or more second processes in said inactive state;
    transitioning said one or more second processes hosted on said first processor from said inactive state to a higher power state; and
    retrieving said locally stored positioning parameter and utilizing said retrieved locally stored positioning parameter in execution of said one or more second processes.

2. The method as recited in claim 1, wherein said positioning engine is hosted on a second processor connected to said bus.

3. The method as recited in claim 1, and further comprising, at said mobile device:
    detecting said operational mode transformation based, at least in part, on a prediction that said operational mode transformation of said at least one of said one or more first processes is to occur at a subsequent time.

4. The method as recited in claim 3, wherein said prediction is based, at least in part, on a history of activity obtained from monitoring said one or more first processes.

5. The method as recited in claim 3, wherein said prediction is based, at least in part, on a time measurement.

6. The method as recited in claim 1, wherein said operational mode transformation of said at least one of said one or more first processes comprises restoration of an application to a particular power state on said first processor.

7. The method as recited in claim 1, wherein said first processor operates in accordance with an Android™ operating system.

8. An apparatus for use in a mobile device, said apparatus comprising:
 means for monitoring one or more first processes hosted on a first processor on said mobile device;
 means for transitioning one or more second processes hosted on said first processor to an inactive state, said one or more second processes utilizing location parameters;
 means for initiating a communication on a bus connecting said first processor to a positioning engine external to said first processor to obtain at least one updated location parameter, without activating said positioning engine, in response to detection of an operational mode transformation of at least one of said one or more first processes, said at least one updated location parameter having been previously determined by said positioning engine;
 means for updating a locally stored positioning parameter based, at least in part on said at least one updated location parameter while maintaining said one or more second processes in said inactive state;
 means for transitioning said one or more second processes hosted on said first processor from said inactive state to a higher power state; and
 means for retrieving said locally stored positioning parameter and utilizing said retrieved locally stored positioning parameter in execution of said one or more second processes.

9. The apparatus as recited in claim 8, wherein said positioning engine is hosted on a second processor connected to said bus.

10. The apparatus as recited in claim 8, and further comprising:
 means for detecting said operational mode transformation based, at least in part, on a prediction that said operational mode transformation of said at least one of said one or more first processes is to occur at a subsequent time.

11. The apparatus as recited in claim 8, wherein said prediction is based, at least in part, on a history of activity obtained from monitoring said one or more first processes.

12. A mobile device comprising:
 a bus;
 a first processor coupled to said bus; and
 a second processor coupled to said bus and configured to obtain location parameters based, at least in part, on acquired signals, said first processor being configured to monitor one or more first processes hosted on said first processor and to transition one or more second processes hosted on said first processor to an inactive state, said one or more second processes utilizing location parameters, initiate a communication on said bus to said second processor to obtain at least one of said updated location parameters, without activating said positioning engine, in response to detection of an operational mode transformation of at least one of said one or more first processes, said at least one of said updated location parameters having been previously determined by said second processor; update a local stored positioning parameter based at least in part on said at least one updated location parameter while maintaining said one or more second processes in said inactive state; transition said one or more second processes on said first processor from said inactive state to a higher power state; and retrieve said locally stored positioning parameter and utilize said retrieved locally stored positioning parameter in execution of said one or more second processes.

13. The mobile device as recited in claim 12, wherein said updated location parameters are determined using a positioning engine hosted on said second processor wherein said positioning engine hosted on a second processor to be connected to said bus.

14. The mobile device as recited in claim 12, said first processor being further configured to:
 detect said operational mode transformation based, at least in part, on a prediction that said operational mode transformation of said at least one of said one or more first processes is to occur at a subsequent time.

15. The mobile device as recited in claim 14, wherein said prediction is based, at least in part, on a history of activity obtained by said application processing in monitoring said one or more first processes.

16. The mobile device as recited in claim 14, wherein said prediction is based, at least in part, on a time measurement.

17. The mobile device as recited in claim 12, wherein said operational mode transformation of said at least one of said one or more first processes comprises restoration of an application to a particular power state on said first processor.

18. The mobile device as recited in claim 12, wherein said first processor operates in accordance with an Android™ operating system.

19. An article comprising:
 a non-transitory computer readable medium having stored therein computer implementable instructions executable by a first processor of a mobile device to:
 monitor one or more first processes hosted on said first processor and transition one or more second processes hosted on said first processor to an inactive state, said one or more second processes utilizing location parameters;
 initiate a communication on a bus connecting said first processor to a positioning engine external to said first processor to obtain at least one updated location parameter, without activating said positioning engine, in response to detection of an operational mode transformation of at least one of said one or more first processes, said at least one updated location parameter having been previously determined by said positioning engine; update a local stored positioning parameter based at least in part on said at least one updated location parameter while maintaining said one or more second processes in said inactive state; transition said one or more second processes on said first processor from said inactive state to a higher power state; and retrieve said locally stored positioning parameter and utilize said retrieved locally stored positioning parameter in execution of said one or more second processes.

20. The article as recited in claim 19, wherein said positioning engine is hosted on a second processor connected to said bus.

21. The article as recited in claim 19, said computer implementable instructions being further executable by said first processor to:
 detect said operational mode transformation based, at least in part, on a prediction that said operational mode transformation of said at least one of said one or more first processes is to occur at a subsequent time.

22. The article as recited in claim 19, wherein said activity of said at least one of said one or more first processes comprises restoration of an application to a particular power state on said first processor.

23. The method as recited in claim 1, wherein an event indicates said operational mode transformation and wherein said event comprises one of a display on/off event, a time zone even, a locale event, a phone context event, or an application activation/deactivation.

24. The method as recited in claim 1, wherein an event indicates said operational mode transformation and wherein said event comprises a post to an operating system of said mobile device.

25. The mobile device of claim 12, wherein an event indicates said operational mode transformation and wherein said event comprises one of a display on/off event, a time zone even, a locale event, a phone context event, or an application activation/deactivation.

26. The mobile device of claim 12, wherein an event indicates said operational mode transformation and wherein said event comprises a post to an operating system of said mobile device.

* * * * *